US012372294B2

(12) United States Patent
Han et al.

(10) Patent No.: US 12,372,294 B2
(45) Date of Patent: Jul. 29, 2025

(54) REFRIGERATOR

(71) Applicant: SAMSUNG ELECTRONICS CO., LTD., Suwon-si (KR)

(72) Inventors: Jongwoo Han, Suwon-si (KR); Youngkyu Moon, Suwon-si (KR); Jaejin Lee, Suwon-si (KR); Sungwook Kang, Suwon-si (KR); Joongkyung Park, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 573 days.

(21) Appl. No.: 17/221,090

(22) Filed: Apr. 2, 2021

(65) Prior Publication Data

US 2021/0310287 A1 Oct. 7, 2021

(30) Foreign Application Priority Data

Apr. 2, 2020 (KR) ........................ 10-2020-0040380

(51) Int. Cl.
*F25D 23/02* (2006.01)
*E05D 7/04* (2006.01)

(52) U.S. Cl.
CPC ......... *F25D 23/028* (2013.01); *E05D 7/0415* (2013.01); *E05D 2007/0469* (2013.01);
(Continued)

(58) Field of Classification Search
CPC ............. F25D 23/028; F25D 2323/024; E05D 7/0415; E05D 2007/0469; E05D 7/0027; E05Y 2900/31
See application file for complete search history.

(56) References Cited

U.S. PATENT DOCUMENTS 4,070,728 A * 1/1978 Herman ................ E05D 7/0415 16/DIG. 34
4,696,078 A * 9/1987 Stromquist ............. E05D 7/081 16/301

(Continued)

FOREIGN PATENT DOCUMENTS

CN 101131274 A 2/2008
CN 201724504 U 1/2011

(Continued)

OTHER PUBLICATIONS

Extended European Search Report dated Nov. 23, 2022 in European Patent Application No. 21780260.2 (8 pages).

(Continued)

*Primary Examiner* — Kimberley S Wright
(74) *Attorney, Agent, or Firm* — STAAS & HALSEY LLP

(57) ABSTRACT

Provided is a refrigerator including a main body configured to form a storage chamber, a door configured to open and close the storage chamber, a hinge configured to rotatably support the door, and a height adjusting device configured to be coupled to the hinge and located inside the door, wherein the height adjusting device includes a lever provided to be operable from an outside of the door, a power transmission member provided to be movable as the lever rotates, and a support member configured to guide the power transmission member in a first direction as the lever rotates to move the power transmission member so that a height of the door is increased, and guide the power transmission member in a second direction, different from the first direction, as the lever rotates to move the power transmission member so that the height of the door is decreased.

18 Claims, 12 Drawing Sheets

(52) U.S. Cl.
CPC ..... *E05Y 2201/626* (2013.01); *E05Y 2600/12* (2013.01); *E05Y 2900/31* (2013.01); *F25D 2323/021* (2013.01); *F25D 2323/024* (2013.01)

(56) References Cited

U.S. PATENT DOCUMENTS

| | | | | |
|---|---|---|---|---|
| 8,650,712 | B2 * | 2/2014 | Wach | E05F 1/123 16/236 |
| 10,288,343 | B2 | 5/2019 | Ramm et al. | |
| 11,248,407 | B2 * | 2/2022 | Azevedo | E05D 7/0423 |
| 2005/0262663 | A1 * | 12/2005 | Lee | E05D 7/0027 16/221 |
| 2006/0244351 | A1 * | 11/2006 | Moon | F25D 23/028 312/405 |
| 2008/0201902 | A1 * | 8/2008 | Moon | F25D 23/028 16/244 |
| 2009/0038117 | A1 * | 2/2009 | Moon | E05D 7/0027 16/240 |
| 2010/0218342 | A1 * | 9/2010 | Bertolini | E05D 7/0027 16/244 |
| 2011/0001413 | A1 * | 1/2011 | Park | E05D 7/0027 16/248 |
| 2011/0030417 | A1 * | 2/2011 | Kim | F25D 23/028 62/449 |
| 2011/0140585 | A1 * | 6/2011 | Lee | E05D 7/0027 312/405 |
| 2014/0132141 | A1 * | 5/2014 | Sun | F25D 23/028 16/248 |
| 2014/0259529 | A1 * | 9/2014 | Jenkinson | E05D 7/0027 16/248 |
| 2017/0191736 | A1 | 7/2017 | Fleig et al. | |
| 2018/0149409 | A1 * | 5/2018 | Ramm | E05D 15/00 |
| 2019/0085607 | A1 * | 3/2019 | Wantland | F25D 23/028 |
| 2021/0247129 | A1 * | 8/2021 | Park | E05D 7/04 |

FOREIGN PATENT DOCUMENTS

| | | | | |
|---|---|---|---|---|
| CN | 201892366 | U | 7/2011 | |
| CN | 102322720 | A * | 1/2012 | |
| CN | 105466120 | A * | 4/2016 | F25D 23/028 |
| CN | 107654141 | A | 2/2018 | |
| EP | 1 679 481 | A2 | 7/2006 | |
| EP | 2 789 944 | A2 | 10/2014 | |
| EP | 2 789 944 | A3 | 10/2014 | |
| JP | 2007-132533 | | 5/2007 | |
| KR | 20-0338112 | | 1/2004 | |
| KR | 10-2004-0037815 | | 5/2004 | |
| KR | 10-2004-0071539 | | 8/2004 | |
| KR | 10-0512721 | | 9/2005 | |
| KR | 10-0994808 | | 11/2010 | |
| KR | 10-2014-0037662 | | 3/2014 | |
| KR | 10-1480455 | | 1/2015 | |
| KR | 10-1979274 | | 5/2019 | |

OTHER PUBLICATIONS

International Search Report for PCT Application No. PCT/KR2021/003297 dated Jun. 25, 2021.

European Office Action dated May 28, 2024 for European Application No. 21780260.2.

Korean Office Action dated Apr. 30, 2025 for Korean Application No. 10-2020-0040380.

* cited by examiner

REFRIGERATOR

CROSS-REFERENCE TO RELATED APPLICATION

This application is based on and claims priority under 35 U.S.C. § 119 to Korean Patent Application No. 10-2020-0040380, filed on Apr. 2, 2020 in the Korean Intellectual Property Office, the disclosure of which is incorporated herein by reference.

BACKGROUND

1. Field

The disclosure relates to a refrigerator, and more specifically, to a refrigerator having an improved door structure.

2. Description of the Related Art

A refrigerator is a home appliance that is equipped with a main body having a storage chamber and a cold air supply device provided to supply cold air to the storage chamber, and stores food in a fresh state. The storage chamber includes a refrigerating chamber maintained at about 0° C. to 5° C. to store food refrigerated, and a freezing chamber maintained at about 0° C. to −30° C. to store food frozen. In general, the storage chamber is provided to have a front side that is open for insertion/withdrawal of food, and the open front side of the storage chamber is opened and closed by a door.

The refrigerator may be classified into different types according to the storage chamber and the door thereof. A Top Mounted Freezer (TMP)-type refrigerator is provided therein with a storage chamber that is divided into an upper side and a lower side by a horizontal partition while a freezing chamber is formed at the upper side and a refrigerating chamber is formed at the lower side, and a Bottom Mounted Freezer (BMF)-type refrigerator is provided with a refrigerating chamber formed at the upper side while a freezing chamber is formed at the lower side. In addition, a Side By Side (SBS)-type refrigerator is provided therein with a storage chamber that is divided into an left side and a right side by a vertical partition while a freezing chamber is formed at one side and a refrigerating chamber is formed at the other side, and a French Door Refrigerator (FDR)-type refrigerator is provided therein with a storage chamber that is divided into an upper side and a lower side by a horizontal partition while a refrigerating chamber is formed at the upper side and a freezing chamber is formed at the lower side, as the refrigerating chamber at the upper side is open/closed by a pair of doors.

SUMMARY

According to an aspect of the disclosure, there is provided a refrigerator including: a main body configured to form a storage chamber; a door configured to open and close the storage chamber; a hinge configured to rotatably support the door; and a height adjusting device configured to be coupled to the hinge and located inside the door, wherein the height adjusting device includes: a lever provided to be operable from an outside of the door; a power transmission member provided to be movable as the lever rotates. The height adjusting device includes a support member configured to guide the power transmission member in a first direction as the lever rotates to move the power transmission member so that a height of the door is increased, and guide the power transmission member in a second direction, different from the first direction, as the lever rotates to move the power transmission member so that the height of the door is decreased.

The lever may be provided to be rotatable, the power transmission member may be provided to be move linearly in the first direction and the second direction according to a direction of rotation of the lever.

The support member may be supported by the hinge and is configured to guide the power transmission member to perform relative movement with respect to the door to thereby adjust the height of the door.

The support member may include a support inclined portion configured to support the power transmission member such that the height of the door is adjusted in response to the power transmission member being moved in the first direction or the second direction.

The power transmission member may include a conversion inclined portion supported by the support member such that the height of the door is adjusted in response to the power transmission member being moved in the first direction or the second direction.

The first direction may be set as a direction in which the power transmission member moves toward the support member, and the second direction may be set as a direction in which the power transmission member moves away from the support member.

The height adjusting device may include a case fixed to the door and in which the support member is movably accommodated.

The case may be formed to allow relative movement of the power transmission member in the first direction or the second direction while restricting relative movement of the power transmission member in a height direction of the door.

The case may include a lever opening formed to allow at least a portion of the lever to be exposed to the outside of the door.

The door may be an upper door and the refrigerator may include a lower door, and the height adjusting device may be located on one end of the upper door adjacent to the lower door.

The refrigerator may further include: a bolt provided to rotate as the lever rotates; and a nut coupleable to the bolt, and while coupled to the bolt configured to be movable together with the power transmission member.

The nut may be fixed to be restricted from performing relative rotation with respect to the power transmission member.

The lever may be provided to be manipulated from the outside of the door while the storage chamber is closed by the door.

The lever may include a screw thread spirally extended with the first direction or the second direction as an axis, and the power transmission member may include a rack formed to be engaged with the screw thread.

The lever may include a manipulation portion and a pinion at an end portion of a side opposite to the manipulation portion, and the power transmission member may include a rack formed to be engaged with the pinion.

According to another aspect of the disclosure, there is provided a refrigerator including: a main body configured to form a storage chamber; a door configured to open and close the storage chamber; a hinge configured to rotatably support the door; and a height adjusting device configured to be coupled to the hinge and provided on the door, wherein the height adjusting device includes: a lever having at least a portion thereof exposed to an outside of the door, the lever being rotatable from the outside of the door; a bolt fixed to the lever, and provided to rotate together with the lever; a nut coupled to the bolt; a power transmission member, to which the nut is fixed, provided to be movable as the lever rotates; and a support member configured to support the power transmission member such that a height of the door is adjusted in response to the power transmission member being moved by the lever toward and away from the support member.

The support member may include a support inclined portion configured to support the power transmission member in a direction to change the height of the door when the power transmission member is moved by the lever, and the power transmission member may include a conversion inclined portion provided to correspond to the support inclined portion.

The support member may be configured to perform relative movement with respect to the door.

The door may be an upper door and the refrigerator may include a lower door, and the height adjusting device may be located at one end of the upper door adjacent to the lower door.

According to another aspect of the disclosure, there is provided a refrigerator including: a main body configured to form a storage chamber; a door configured to open and close the storage chamber; a hinge configured to rotatably support the door; and a height adjusting device mountable on the door, wherein the height adjusting device includes: a lever having a manipulation portion that is exposed to an outside of the door, the lever being rotatable from the outside of the door; a power transmission member configured to be movable as the lever rotates; and a support member including a support inclined portion formed to move the power transmission member along a height direction of the door when the power transmission member is moved by the lever toward and away from the support member.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
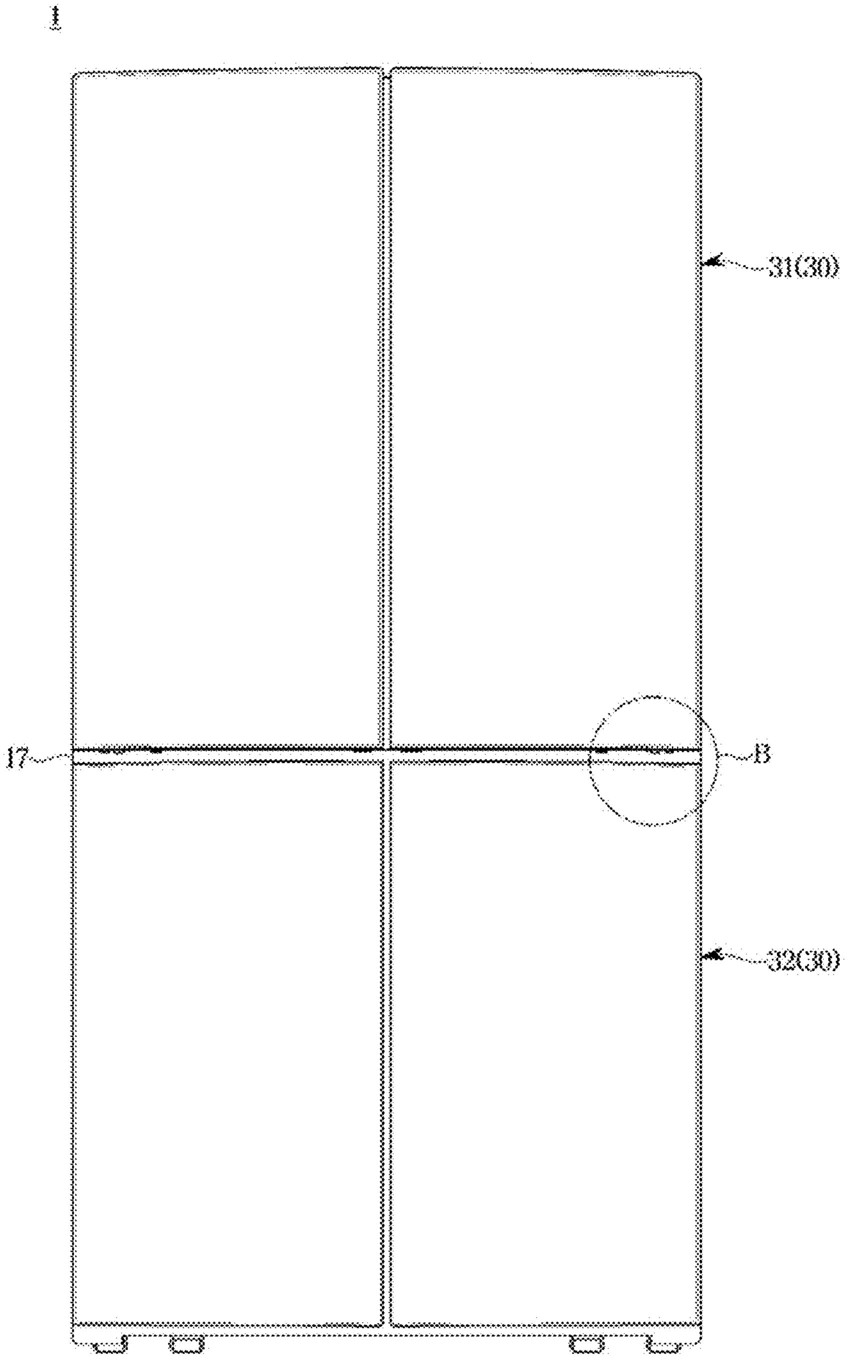
FIG. 1 is a view illustrating a refrigerator according to an embodiment of the disclosure.

Embodiments and features as described and illustrated in the disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "front", "rear", "upper", "lower", "top", and "bottom" as herein used are defined with respect to the drawings, but the terms may not restrict the shape and position of the respective components.

Therefore, it is an aspect of the disclosure to provide a refrigerator in which the height of a door is easily adjustable.

It is another aspect of the disclosure to provide a refrigerator having the external appearance formed to be neat.

Hereinafter, embodiments of the disclosure will be described in detail with reference to the accompanying drawings.

Figure 2:
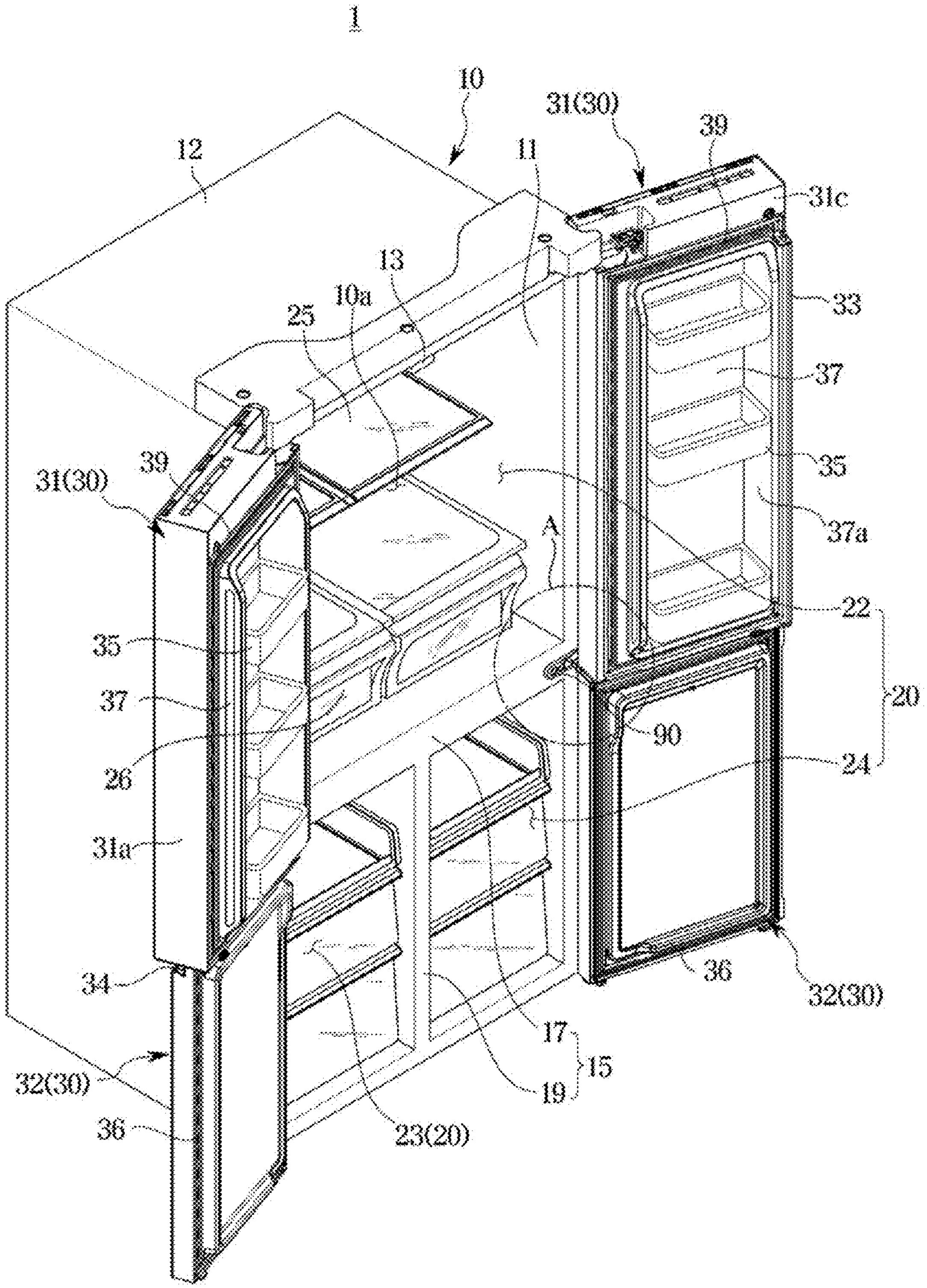
FIG. 2 is a view illustrating a state in which doors of the refrigerator shown in FIG. 1 is opened.

FIG. 1 is a view illustrating a refrigerator according to an embodiment of the disclosure. FIG. 2 is a view illustrating a state in which doors of the refrigerator shown in FIG. 1 is opened.

Referring to FIGS. 1 and 2, a refrigerator 1 includes a main body 10, a storage chamber 20 formed in the main body 10 to be divided in the upper-lower direction, a door 30 for opening and closing the storage chamber 20, and a cold air supply device (not shown) for supplying cold air to the storage chamber 20.

The main body 10 may include an inner case 11 forming the storage chamber 20, an outer case 12 coupled to the outside of the inner case 11 to form the external appearance, and a body insulating material (not shown) foamed between the inner case 11 and the outer case 12 to insulate the storage chamber 20.

The cold air supply device may generate cold air using a cooling circulation cycle in which a refrigerant is compressed, condensed, expanded, and evaporated.

The storage chamber 20 may be divided into a plurality of spaces by a partition 15, and a plurality of shelves 25 and storage containers 26 may be provided in the storage chamber 20 to store food and the like.

The storage chamber 20 may be divided into a plurality of storage chambers 22, 23, and 24 by a partition 15, and the partition 15 may include a first partition 17 coupled to the inside of the storage chamber 20 in the left-right direction to divide the storage chamber 20 into an upper storage chamber (or a first storage chamber, 22) and lower storage chambers 23 and 24 and a second partition 19 coupled to the lower storage chambers 23 and 24 in the upper-lower direction to divide the lower storage chambers 23 and 24 into a second storage chamber 23 and a third storage chamber 24.

The partition 15 provided in a T-shape by coupling the first partition 17 to the second partition 19 may divide the storage chamber 20 into three spaces. Among the upper storage chamber 22 and the lower storage chambers 23 and 24 divided by the first partition 17, the upper storage chamber 22 may be used as a refrigerating chamber, and the lower storage chambers 23 and 24 may be used as freezing chambers.

The lower storage chambers 23 and 24 may be used as freezing chambers, but the second storage chamber 23 may be used as a freezing chamber and the third storage chamber 24 may be used as a refrigerating chamber, and the second storage chamber 23 may be used as a freezing chamber and the third storage chamber 24 may be used a freezing chamber or a refrigerating chamber according to a user's setting.

The division of the storage chamber 20 as described above is merely an example, and the storage chambers 22, 23, and 24 may be provided in various uses different from the above.

The storage chamber 20 may be opened and closed by the door 30. The door 30 includes a pair of first doors (or upper doors 31) for opening and closing the upper storage chamber 22 and a pair of second doors (or lower doors 32) for opening and closing the lower storage chambers 23 and 24. The pair of first doors 31 and the pair of second doors 32 may open and close a main body opening 10*a* of the main body 10.

One of the pair of first doors 31 may be provided with a rotating bar 33. The rotating bar 103 may seal a gap between the pair of first doors 31 when the pair of first doors 31 are closed. The main body 10 may be provided with a rotating bar guide 13 that guides the movement of the rotating bar 33.

In the following description, for the sake of convenience of description, only one first door 31 and one second door 32 will be described, and descriptions of the remaining first door 31 and the remaining second door 32 will be omitted. However, the first door 31 and the second door 32, which are not described, may be provided in a mirror symmetry with the first door 31 and the second door 32 described below, and have approximately the same configurations as those of the first door 31 and the second door 32 described below. In addition, the second door 32 may adopt the same configuration as that of the first door 31, and in the description of the second door 31, detailed description of the same configuration will be omitted.

The upper storage chamber 22 may be opened and closed by the first door 31 that is rotatably coupled to the main body 10. The first door 31 may perform the open and closing through a first door handle (not shown). The first door handle may be formed as a recession in a bottom surface or one side surface of the first door 31.

The first door 31 includes a door outer case 31*a* forming a front surface and both lateral sides of the first door 31, a lower door cap (31*b* in FIG. 3) forming a lower surface of the first door 31, an upper door cap 31*c* forming an upper surface of the first door 31, and a door inner case 37 forming a rear surface of the first door 31.

The first door 31 is provided on the rear surface with a door shelf 35 capable of storing food.

The first door 31 may include shelf support portions 37*a* extending vertically from the first door 31 to support the door shelf 35 at both left and right sides of the door shelf 35. The shelf support portions 37*a* may be separately provided and detachably coupled to the first door 31. In the embodiment, the shelf support portions 37*a* may be integrally formed with the door inner case 37 of the first door 31, and formed to protrude backward of the door inner case 37 and extending in the upper-lower direction.

The first door 31 is provided on the edge of the rear surface with a first gasket 39 to seal a gap with the main body 10 when the first door 31 is in a closed state. The first gasket 39 may be installed in a loop shape along the edge on the rear surface of the first door 31, and may include a first magnet (not shown) installed therein.

The lower storage chambers 23 and 24 may be opened and closed by the second doors 32 rotatably coupled to the main body 10. The second door 32 may be opened and closed through a second door handle 34. The second door handle 34 may be formed as a recession in the upper surface of the second door 32. Although not shown, the second door 32 may be provided in a sliding type door.

The second door 32 may be provided on the edge of a rear surface of with a second gasket 36 to seal a gap with the main body 10 when the second door 32 is in a closed state. The second gasket 106 may be installed in the form of a loop along the edge on the rear surface of the second door 32, and may include a second magnet (not shown) installed therein.

A hinge 90 may rotatably support the first door 31. The hinge 90 may be installed on the first partition 17. The hinge 90 may be provided to support both the first door 31 and the second door 32.

Figure 3:
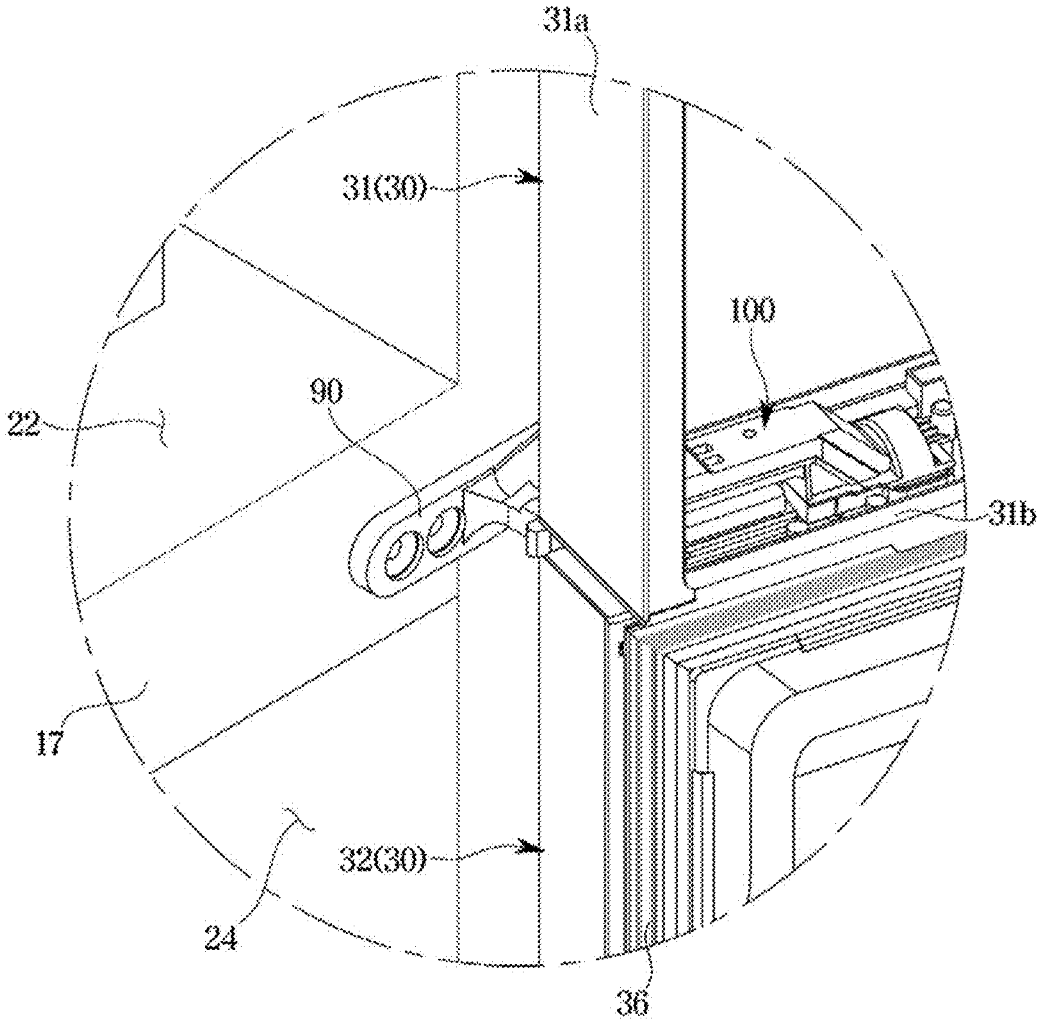
FIG. 3 is an enlarged view illustrating portion A shown in FIG. 2, in which a door inner case of a first door is disassembled.
Figure 4:
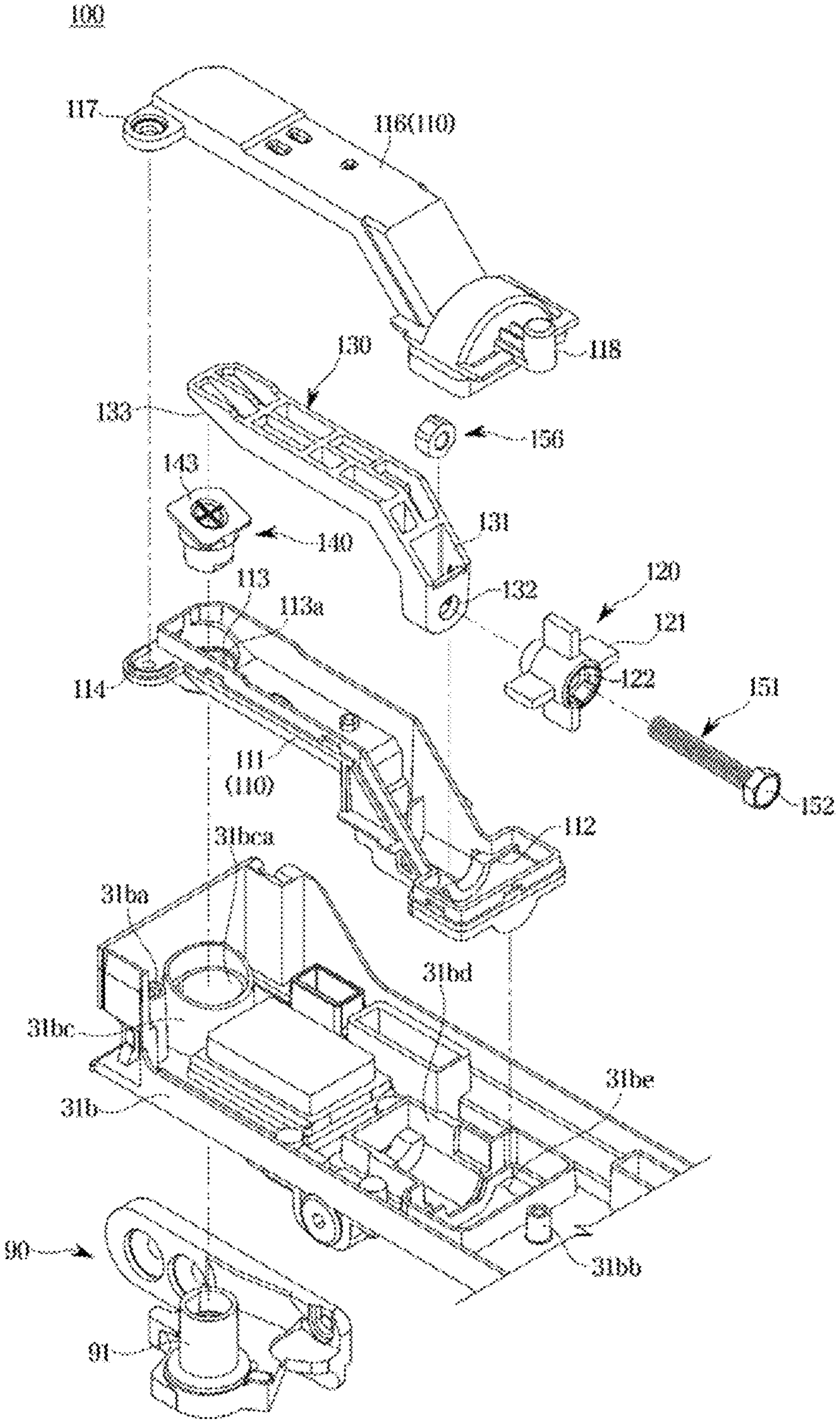
FIG. 4 is an exploded view illustrating a height adjusting device shown in FIG. 3.
Figure 5:
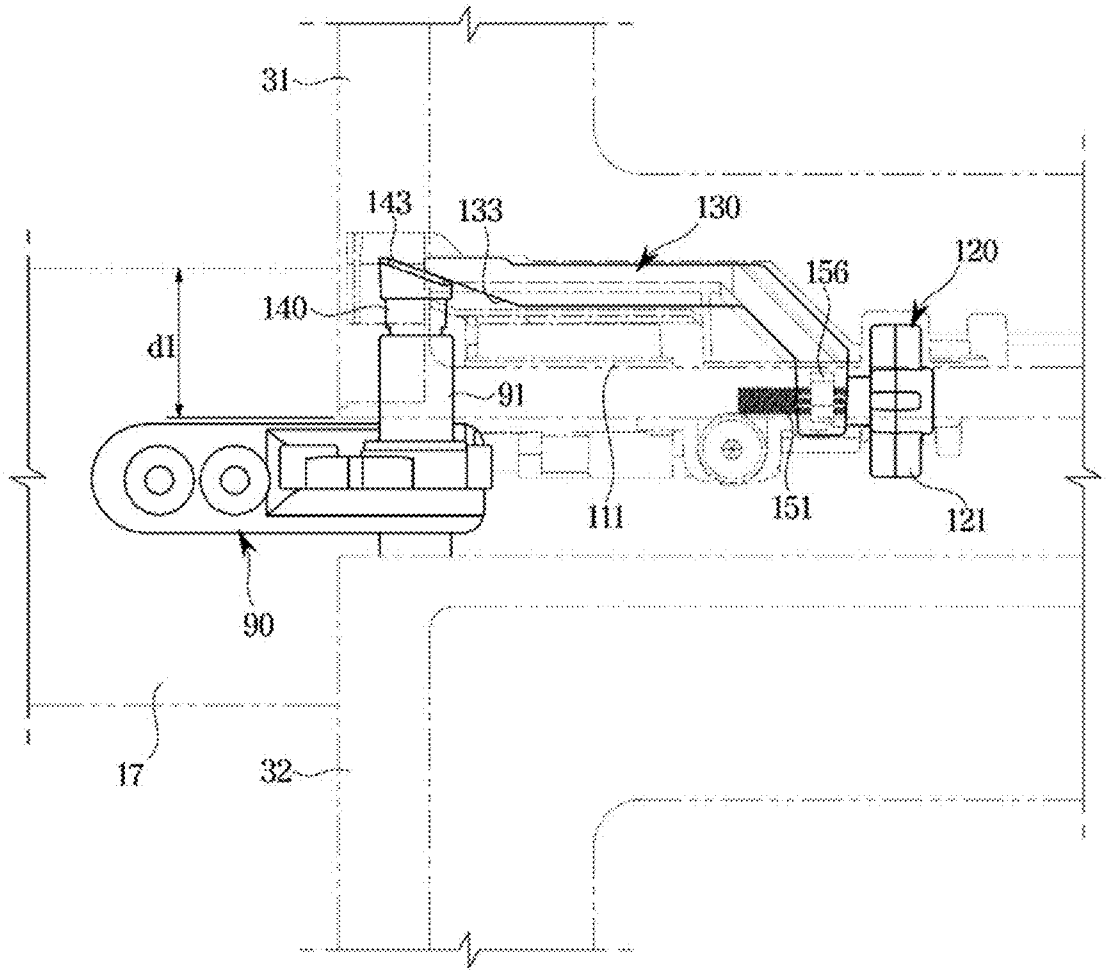
FIG. 5 is an enlarged cross sectional view illustrating portion B shown in FIG. 1, which shows a state of the height adjusting device that supports the first door at the first height.
Figure 6:
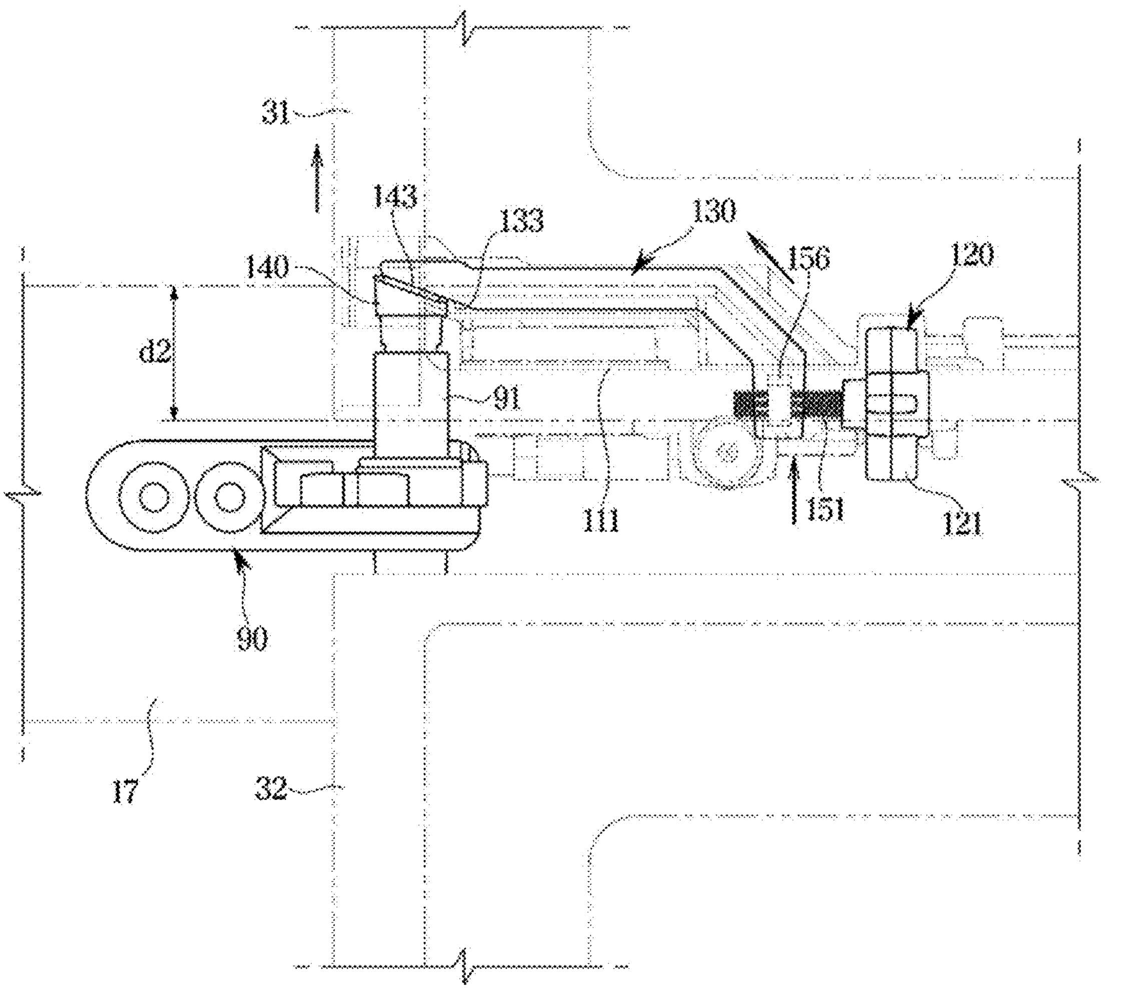
FIG. 6 is a cross sectional view illustrating a state of the height adjusting device shown in FIG. 5 that supports the first door at the second height.

FIG. 3 is an enlarged view illustrating portion A shown in FIG. 2, in which a door inner case of a first door is disassembled. FIG. 4 is an exploded view illustrating a height adjusting device shown in FIG. 3. FIG. 5 is an enlarged cross sectional view illustrating portion B shown in FIG. 1, which shows a state of the height adjusting device that supports the first door at the first height. FIG. 6 is a cross sectional view illustrating a state of the height adjusting device shown in FIG. 5 that supports the first door at the second height.

In FIG. 3, the interior of the first door 31 shown in FIG. 2 is illustrated with the door inner case 37 separated from the first door 31. Referring to FIG. 3, a height adjusting device 100 configured to adjust the height of the first door 31 may be disposed inside the first door 31. The height adjusting device 100 may be disposed on the lower door cap 31*b* of the first door 31.

Referring to FIG. 4, the lower door cap 31*b* of the first door 31 may include device fixing portions 31*ba* and 31*bb* to which the height adjusting device 100 is fixed. The device fixing portions 31*ba* and 31*bb* may include a first device fixing portion 31*ba* and a second device fixing portion 31*bb*.

The lower door cap 31*b* of the first door 31 may include a hinge coupling portion 31*bc* that rotatably supports a hinge shaft 91 of the hinge 90. The hinge coupling portion 31*bc* may include a hinge opening 31*bca* into which the hinge shaft 91 is rotatably inserted. The hinge opening 31*bca* may be provided to communicate with an accommodating portion opening 113*a* of a support member accommodating portion 113 of a case 110. Accordingly, an upper end portion of the hinge shaft 91 inserted into the hinge opening 31*bca* may come in contact with a lower end portion of a support member 140 inserted into the accommodating portion opening 113*a*, and the support member 140 may be supported by the hinge 90.

The lower door cap 31*b* may include a case seating portion 31*bd* on which the case 110 is seated. The case seating portion 31*bd* may accommodate a portion where the lever 120 of the case 110 is located. The case seating portion 31*bd* may include a door cap opening 31*be* corresponding to a lever opening 112 of the case 110. At least a portion of the lever 120 may be exposed to the outside of the first door 31 through the lever opening 112 of the case 110 and the door cap opening 31*be* of the lower door cap 31*b*.

Referring to FIGS. 3 and 4, the height adjusting device 100 may be disposed at a lower end portion of one side of the first door 31 that is coupled to the hinge 90. The height adjusting device 100 may include the case 110, the lever 120, a power transmission member 130, and the support member 140.

The case 110 may be fixed to the first door 31. The case 110 may form a space in which the lever 120, the power transmission member 130, and the support member 140 are accommodated. The case 110 may accommodate the support member 140 such that the support member 140 is movable therein.

The case 110 may be provided to allow relative movement of the power transmission member 130 in the approximately horizontal direction, but restrict relative movement of the power transmission 130 in the approximately vertical direction. The vertical direction is defined as an upper-lower direction according to the direction of gravity, and the horizontal direction is defined as a direction perpendicular to the vertical direction. That is, the power transmission member 130 may move in an approximately horizontal direction with respect to the case 110, but may not move in an approximately vertical direction with respect to the case 110, and may move in an approximately vertical direction together with the case 110. The power transmission member 130 may perform relative motion with respect to the case 110 along the width direction of the first door 31. The power transmission member 130 may perform relative motion with respect to the case 110 in a direction toward the support member 140 or away from the support member 140.

The case 110 may include a lower case 111 and an upper case 116.

The lower case 111 may accommodate the lever 120 such that the lever 120 is rotatable therein. The lower case 111 may include the lever opening 112 for exposing at least a portion of the lever 120 to the outside of the first door 31. The lower door cap 31*b* of the first door 31 may include the door cap opening 31*be* corresponding to the lever opening 112. With such a configuration, at least a portion of the lever 120 may be exposed to the outside of the first door 31.

The lower case 111 may accommodate the power transmission member 130 such that the power transmission member 130 is movable therein. The lower case 111 may be provided to limit the upper and lower movement of the power transmission member 130 with respect to the case 110 together with the upper case 116.

The lower case 111 may include the support member accommodating portion 113 that accommodates the support member 140 such that the support member 140 is movable therein. At least a portion of the support member 140 may be movably inserted into the support member accommodating portion 113. The support member accommodating portion 113 may be formed to communicate with the hinge opening 31*bca* of the hinge coupling portion 31*bc* of the lower door cap 31*b*.

The lower case 111 may include a lower cap fastening portion 114 to be fixed to the lower door cap 31*b*. The lower cap fastening portion 114 may be fixed to the first device fixing portion 31*ba* through a fixing member (not shown). The lower cap fastening portion 114 may be provided to correspond to an upper cap fastening portion 117 of the upper case 116.

The upper case 116 may be provided to cover an upper part of the lower case 111. The upper case 116 may include an upper cap fastening portion 117 provided to correspond to the lower cap fastening portion 114. In a state in which the upper cap fastening portion 117 together with the lower cap fastening portion 115 are positioned to correspond to the first device fixing portion 31*ba*, a fixing member is coupled, so that the case 110 may be fixed to the lower door cap 31*b*.

The upper case 116 may include a cap fixing portion 118 that is to be fixed to the second device fixing portion 31*bb*. The cap fixing portion 118 may be directly coupled to the second device fixing portion 31*bb* of the lower door cap 31*b*.

The case 110 may be fixed to the lower door cap 31*b* as the lower cap fastening portion 114 and the upper cap fastening portion 117 are fixed to the first device fixing portion 31*ba*, and the cap fixing portion 118 is fixed to the second device fixing portion 31*bb*.

The lever 120 may be rotatably mounted inside the case 110. The user may adjust the height of the first door 31 by rotating the lever 120 to operate the height adjusting device 100.

Referring to FIG. 5, at least a portion of the lever 120 may be exposed to the outside through the lever opening 112 of the case 110. Accordingly, the user may operate the height adjusting device 100 by rotating the portion of the lever 120 exposed to the outside. That is, the lever 120 may be provided to be rotated by the user from outside of the first door 31. Since the height adjusting device 100 according to the embodiment of the disclosure may adjust the height of the first door 31 by rotating the lever 120 protruding from the bottom surface of the first door 31, the height of the first door 31 may be easily adjusted without a separate tool.

The lever 120 may be rotated on a rotation axis approximately parallel to the direction in which the power transmission member 130 moves. When the lever 120 rotates in a first rotation direction, the power transmission member 130 may become close to the support member 140, the first door 31 may increase in height, and when the lever 120 rotates in a second rotation direction opposite to the first rotation direction, the power transmission member 130 may become distant from the support member 140, and the first door 31 may decrease in height.

Referring to FIG. 5, the height adjusting device 100 may be located at the lower end of the first door 31 that is adjacent to the second door 32. Accordingly, the lever 120 may be exposed to a space between the first door 31 and the second door 32. Therefore, the lever 120 according to the embodiment of the disclosure may be rotated by a user to adjust the height of the first door 31 even when the first door 31 and the second door 32 close the storage chambers 22 and 24. The height adjusting device 100 according to the embodiment of the disclosure allows only a part of the lever 120 to be exposed to the outside of the first door 31 to be manipulated by the user while having other parts located inside the first door 31, so that the space between the first door 31 and the second door 32 may be further reduced, and the external appearance may be formed to be neat.

The lever 120 may include a manipulation portion 121 provided in a radial shape around the rotation axis. In FIG. 4, the manipulation portion 121 is illustrated as being provided in four units thereof, but the number of the manipulation portions 121 is not limited thereto. The manipulation portion 121 may protrude to the outside of the first door 31 through the lever opening 112.

The lever 120 may include a bolt fixing portion 122 to which a head 152 of a bolt 151 is fixed. The bolt fixing portion 122 may be provided in a size and/or shape corresponding to that of the head 152 of the bolt 151. In a state in which the bolt 151 is coupled to the lever 120, the bolt fixing portion 122 may support the head 152 of the bolt 151 to prevent the bolt 151 from being rotated with respect to the lever 120.

The bolt 151 may be fixed to the lever 120. The bolt 151 may be provided to rotate together with the lever 120. The bolt 151 may be coupled to a nut 156 coupled to the power transmission member 130. As the bolt 151 rotates with respect to the nut 156, the power transmission member 130 may move linearly together with the nut 156.

The power transmission member 130 may be provided to be movable inside the case 110. The power transmission member 130 may be provided to be movable in the horizontal direction with respect to the case 110, but restricted on movement in the vertical direction. The power transmission member 130 may be moved by receiving power from the lever 120. The power transmission member 130 may be provided to be linearly moved by rotation of the lever 120. The power transmission member 130 may be provided to receive a force in a first direction by the lever 120. The first direction may be set as an approximately horizontal direction.

The power transmission member 130 may include a nut fixing portion 131 into which the nut 156 is inserted and fixed. The nut fixing portion 131 may be provided to prevent rotation of the nut 156 when the nut 156 is inserted into the nut fixing portion 131. That is, the nut 156 may be fixed to be restricted from performing relative rotation with respect to the power transmission member 130. Accordingly, when the bolt 151 rotates, the nut 156 may linearly move together with the power transmission member 130.

The power transmission member 130 may include a bolt opening 132 through which the bolt 151 passes. When the nut 156 inserted into the nut fixing portion 131 is positioned in between the bolt opening 132, the bolt 151 may pass through the bolt opening 132 and the nut 156. Accordingly, the power transmission member 130 may be linearly moved by receiving the rotational force of the lever 120.

In the embodiment, the nut 156 is illustrated as being separately provided from the power transmission member 130, but the nut 156 may be integrally formed with the power transmission member 130. That is, the power transmission member 130 may be provided with a screw thread formed on the bolt opening 132.

The power transmission member 130 may include a conversion inclined portion 133. The conversion inclined portion 133 may be formed to correspond to a support inclined portion 143 of the support member 140. When the power transmission member 130 moves linearly, the conversion inclined portion 133 may be provided to be supported by the support inclined portion 143 such that the power transmission member 130 performs upward movement while lifting the first door 31. That is, with respect to the case 110, the power transmission member 130 may only move in a direction toward or away from the support member 140 while being prevented from moving in the upper-lower direction. However, the power transmission member 130 may perform movement in the upper-lower direction with respect to the hinge 90 together with the case 110 and the first door 31 to which the case 110 is fixed. That is, when the power transmission member 130 is lifted by the support member 140, the power transmission member 130 may be provided to lift the case 110 and the first door 31 to which the case 110 is fixed.

The conversion inclined portion 133 may be supported by the support member 140 to be moved in an approximately vertical direction when the power transmission member 130 moves in an approximately horizontal direction. The conversion inclined portion 133 may be formed to slope upward along a direction in which the power transmission member 130 moves toward the support member 140.

The support member 140 may be accommodated to be movable in the support member accommodating portion 113 of the case 110. The support member 140 may be provided to perform relative movement with respect to the case 110. The support member 140 may be configured to perform relative movement with respect to the first door 31. The support member 140 may be supported by the hinge 90. The support member 140 may be provided to apply a force in a second direction different from a first direction to the power transmission member 130 when the power transmission member 130 receives a force in the first direction. The first direction may be set as an approximately horizontal direction, and the second direction may be set as an approximately vertical direction.

In FIG. 4, the support member 140 is illustrated as being provided separately from the hinge 90, but the support member 140 may be formed by extension of a portion of the hinge shaft 91 of the hinge 90. That is, the support member 140 may be formed integrally with the hinge 90.

The support member 140 may include the support inclined portion 143. The support inclined portion 143 may form an upper surface of the support member 140. The support inclined portion 143 may be formed to correspond to the conversion inclined portion 133. When the power transmission member 130 moves, the support inclined portion 143 interacts with the conversion inclined portion 133 to adjust the height of the first door 31. The support inclined portion 143 may support the power transmission member 130 such that the power transmission member 130, while being moved in the horizontal direction by the lever 120, also moves in the vertical direction. The support inclined portion 143 may be formed to slope downward in a direction in which the power transmission member 130 moves away from the support member 140.

Referring to FIGS. 5 and 6, the operation of the height adjusting device 100 according to the embodiment of the disclosure will be described.

The height adjusting device 100 according to the embodiment of the disclosure may support the first door 31 at a first position, which is a relatively low position, as shown in FIG.

5, or may support the first door 31 at a second position, which is a relatively high position.

Referring to FIG. 6, in order to increase the height of the first door 31, the user may apply a force to the manipulation portion 121 of the lever 120 exposed from the bottom surface of the first door 31 to rotate the lever 120 in the first rotation direction.

As the lever 120 is rotated, the bolt 151 fixed to the lever 120 is rotated together with the lever 120. As the bolt 151 is rotated, the nut 156 fixed to the power transmission member 130 to be prevented from being rotated may be moves in a direction away from the lever 120 where the head 152 of the bolt 151 is located.

As the nut 156 is moved in the direction away from the lever 120, that is, in a direction toward the support member 140, the power transmission member 130 moves in a direction toward to the support member 140 together with the nut 156. As the power transmission member 130 moves in the direction toward the support member 140, the conversion inclined portion 133 interacts with the support inclined portion 143.

In detail, since the support member 140 is supported by the hinge shaft 91 of the hinge 90 and the hinge 90 is fixed to the main body 10, the power transmission member 130 may be supported by the support member 140 and moved in a direction to lift the first door 31. As the conversion inclined portion 133 of the power transmission member 130 is supported by the support inclined portion 143 of the support member 140 and moved in the direction to lift the first door 31, the power transmission member 130 is moved upward together with the case 110 and the first door 31. That is, as the power transmission member 130, which is restricted on movement in the upper and lower direction (i.e., the height direction of the first door 31), with respect to the case 110, is moved upward with respect to the support member 140, the case 110 is caused to move upward, and as the case 110 moves upward, the first door 31 is caused to move upward with respect to the main body 10.

On the other hand, referring to FIG. 5, in order to decrease the height of the first door 31, the user may apply a force to the manipulation portion 121 of the lever 120 exposed from the bottom surface of the first door 31 to rotate the lever 120 in the second rotation direction opposite to the first rotation direction.

As the lever 120 is rotated, the bolt 151 fixed to the lever 120 is rotated together with the lever 120. As the bolt 151 is rotated, the nut 156 fixed to the power transmission member 130 to be prevented from being rotated is caused to move in a direction toward the lever 120 where the head 152 of the bolt 151 is located.

As the nut 156 is moved in the direction toward the lever 120, that is, in the direction away from the support member 140, the power transmission member 130 is caused to move in the direction toward the support member 140 together with the nut 156. As the power transmission member 130 moves in the direction toward the support member 140, the conversion inclined portion 133 interacts with the support inclined portion 143.

In detail, as the conversion inclined portion 133 of the power transmission member 130 is supported by the support inclined portion 143 of the support member 140 and moved in the direction to lower the first door 31, the power transmission member 130 is moved downward together with the case 110 and the first door 31. That is, as the power transmission member 130, which is restricted on movement in the upper and lower direction (i.e., the height direction of the first door 31) with respect to the case 110, is moved upward with respect to the support member 140, the case 110 is caused to move upward, and as the case 110 is moved upward, the first door 31 is caused to move downward with respect to the main body 10.

That is, a first distance d1 between the lower end of the first door 31 and the upper end of the first partition 17 in a state in which the first door 31 is at a relatively lower position with respect to the main body 10 as shown in FIG. 5 is provided to be greater than a second distance d2 between the lower end of the first door 31 and the upper end of the first partition 17 in a state in which the first door 31 is at a relatively higher position with respect to the main body 10 as shown in FIG. 6.

With such a configuration, the height adjusting device 100 according to the embodiment of the disclosure may allow a user to easily adjust the height of the first door 31 without a separate tool. In addition, since the height adjusting device 100 is mounted inside the first door 31 with only a portion of the lever 120 exposed to the space between the first door 31 and the second door 32, the gap between the first door 31 and the second door 32 may be minimized compared to a case in which the lever 120 is mounted outside of the first door 31. In addition, since the lever 120 of the height adjusting device 100 is not provided to protrude from the left or right side surface or the upper side surface of the first door 31 and/or the second door 32, but is provided to protrude into a space between the first door 31 and the second doors 32, the external appearance of the refrigerator 1 may be formed to be neat. In addition, since the height adjusting device 100 according to the embodiment of the disclosure is configured such that the first door 31, to which the movable power transmission member 130 is fixed, is lifted by the support member 140, the user may adjust the height of the first door 31 by applying a relatively small force to the lever 120.

Figure 7:
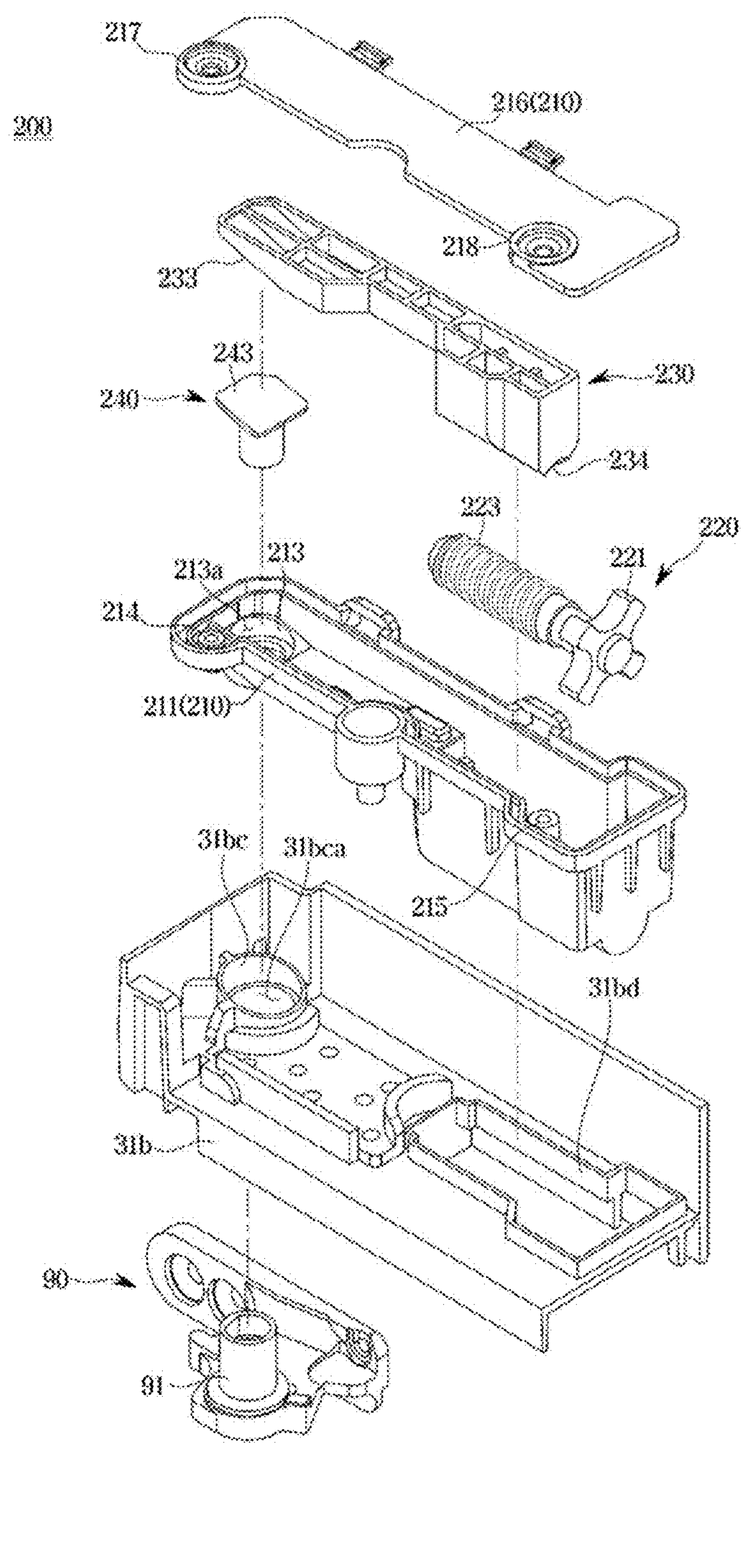
FIG. 7 is a view illustrating a height adjusting device according to another embodiment of the disclosure.
Figure 8:
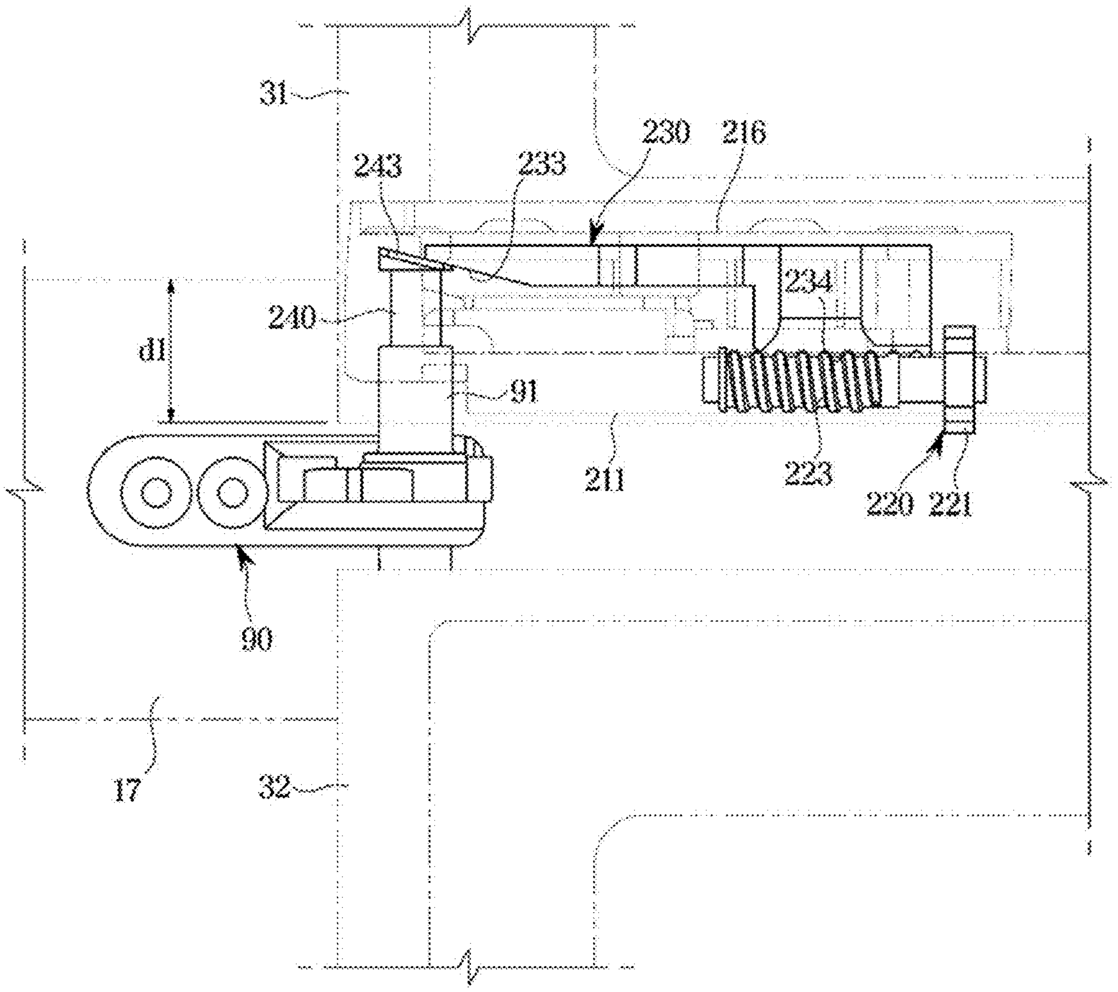
FIG. 8 is a cross sectional view illustrating a state of the height adjusting device shown in FIG. 7 that supports the first door at the first height.
Figure 9:
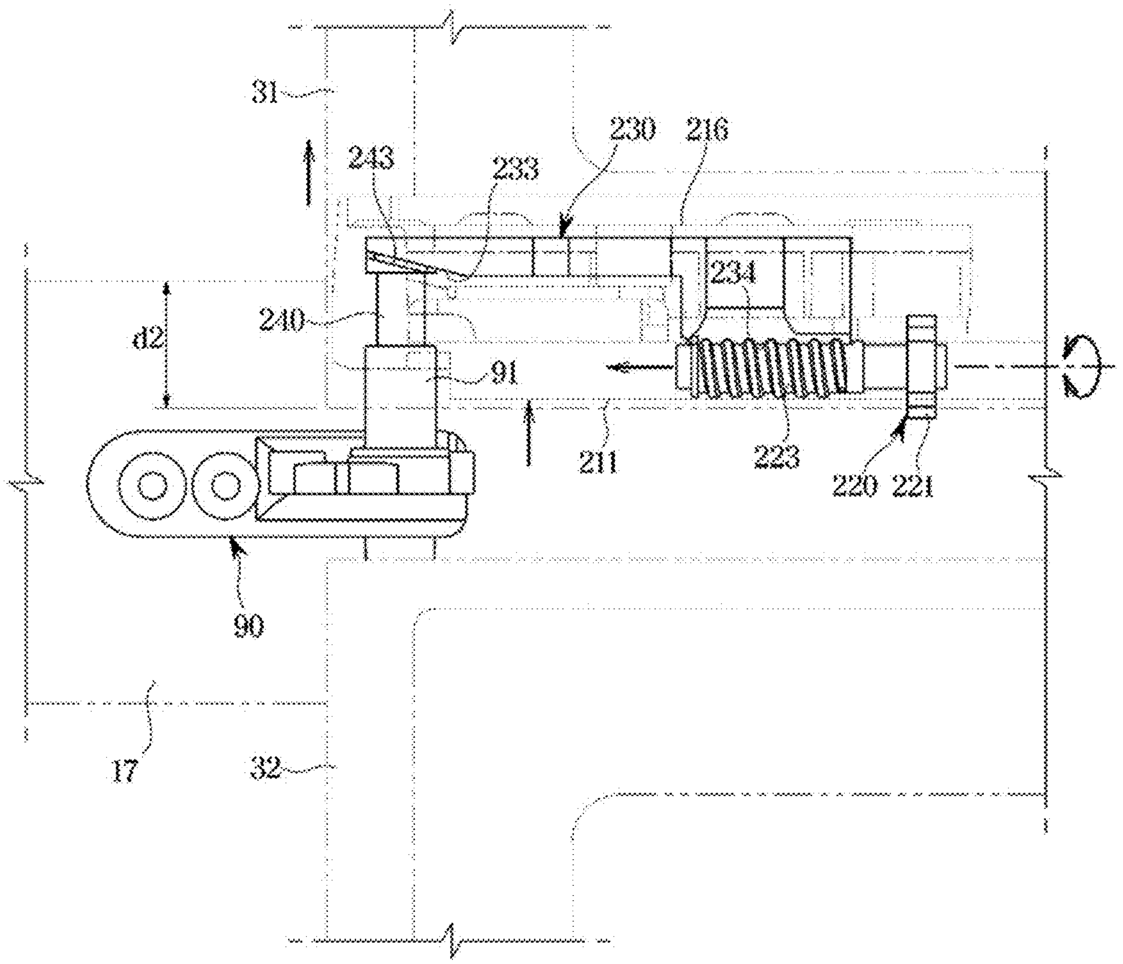
FIG. 9 is a cross sectional view illustrating a state of the height adjusting device shown in FIG. 7 that supports the first door at the second height.

FIG. 7 is a view illustrating a height adjusting device according to another embodiment of the disclosure. FIG. 8 is a cross sectional view illustrating a state of the height adjusting device shown in FIG. 7 that supports the first door at the first height. FIG. 9 is a cross sectional view illustrating a state of the height adjusting device shown in FIG. 7 that supports the first door at the second height.

Hereinafter, a height adjusting device 200 according to the embodiment of the disclosure will be described with reference to FIGS. 7 to 9. In the following description, the same reference numerals are assigned to the same components as those of the previous embodiment shown in FIGS. 1 to 6, and detailed description thereof will be omitted.

Referring to FIG. 7, the height adjusting device 200 according to the embodiment of the disclosure may include a case 210, a lever 220, a power transmission member 230, and a support member 240.

The case 210 may include a lower case 211 and an upper case 216. The case 210 may be seated on the case seating portion 31*bd* of the lower door cap 31*b*. At least a portion of the lever 220 may be exposed to the outside of the first door 31 by the case seating portion 31*bd*.

The lower case 211 may include a lower cap fastening portion 214. The upper case 216 may include an upper cap fastening portion 217. In a state in which the upper cap fastening portion 217 and the lower cap fastening portion 214 are positioned to correspond to the device fixing portion 31*bb* of the lower door cap 31*b*, a fastening member may be coupled, so that the case 110 may be fixed to the lower door cap 31*b*.

The lower case 211 may include an upper case fixing portion 215 for fixing the upper case 216. The upper case

216 may include a lower case fixing portion 218 to be fixed to the lower case 211. In a state in which the lower case fixing portion 218 is positioned to correspond to the upper case fixing portion 215, a fastening member (not shown) is coupled, so that the upper case 216 may be fixed to the lower case 211.

The lever 220 may include a manipulation portion 221 and a screw thread 223. The screw thread 223 may spirally extend along an approximately horizontal axis. The screw thread 223 may be formed to correspond to a rack 234 of the power transmission member 230.

The power transmission member 230 may include the rack 234 formed to correspond to the screw thread 223 of the lever 220. The rack 234 may be formed to engage with the screw thread 223. The rack 234 may be formed to convert the rotational force of the lever 220 into a linear movement force of the power transmission member 230.

The power transmission member 230 includes a conversion inclined portion 233 such that the power transmission member 230 is linearly moved by the lever 220 while being moved in the upper and lower side direction by the support member 240. The support member 240 includes a support inclined portion 243 that interacts with the conversion inclined portion 233 to move the power transmission member 230 in the upper and lower side direction. The support member 240 may be movable accommodated in a support member accommodating portion 213 of the case 210.

The support member accommodating portion 213 may include an accommodating portion opening 213*a* into which the lower end of the support member 240 is inserted. The accommodating portion opening 213*a* may be connected to the hinge opening 31*bca*, so that the support member 240 may be supported by the hinge 90 while in contact with the hinge 90.

When the lever 220 rotates in one direction, the power transmission member 230 may be moved in a direction toward the support member 240 as shown in FIG. 9. As the power transmission member 230 is moved in the direction toward the support member 240, the power transmission member 230 is moved in a direction to lift the first door 31. That is, the power transmission member 230 may be moved upward with respect to the main body 10 together with the case 220 and the first door 31.

On the other hand, when the lever 220 rotates in a direction opposite to the one direction, the power transmission member 230 may be moved in a direction away from the support member 240 as shown in FIG. 8. As the power transmission member 230 moves in the direction away from the support member 240, the power transmission member 230 may be moved in a direction to lower the relative height of the first door 31 with respect to the main body 10. That is, the power transmission member 230 may be moved downward with respect to the main body 10 together with the case 220 and the first door 31.

That is, a first distance d between the lower end of the first door 31 and the upper end of the first partition 17 in a state in which the first door 31 is at a relatively lower position with respect to the main body 10 as shown in FIG. 8 is provided to be greater than a second distance d2 between the lower end of the first door 31 and the upper end of the first partition 17 in a state in which the first door 31 is at a relatively higher position with respect to the main body 10 as shown in FIG. 9.

Figure 10:
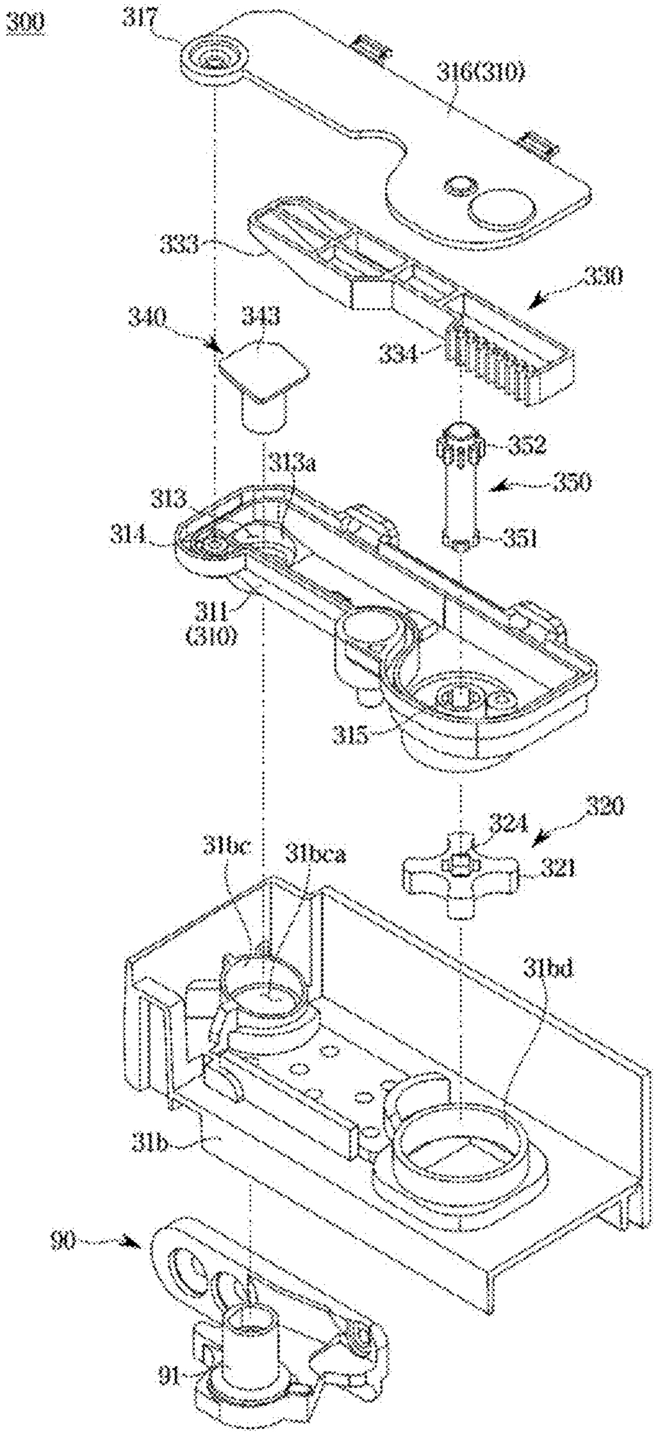
FIG. 10 is a view illustrating a height adjusting device according to still another embodiment of the disclosure.
Figure 11:
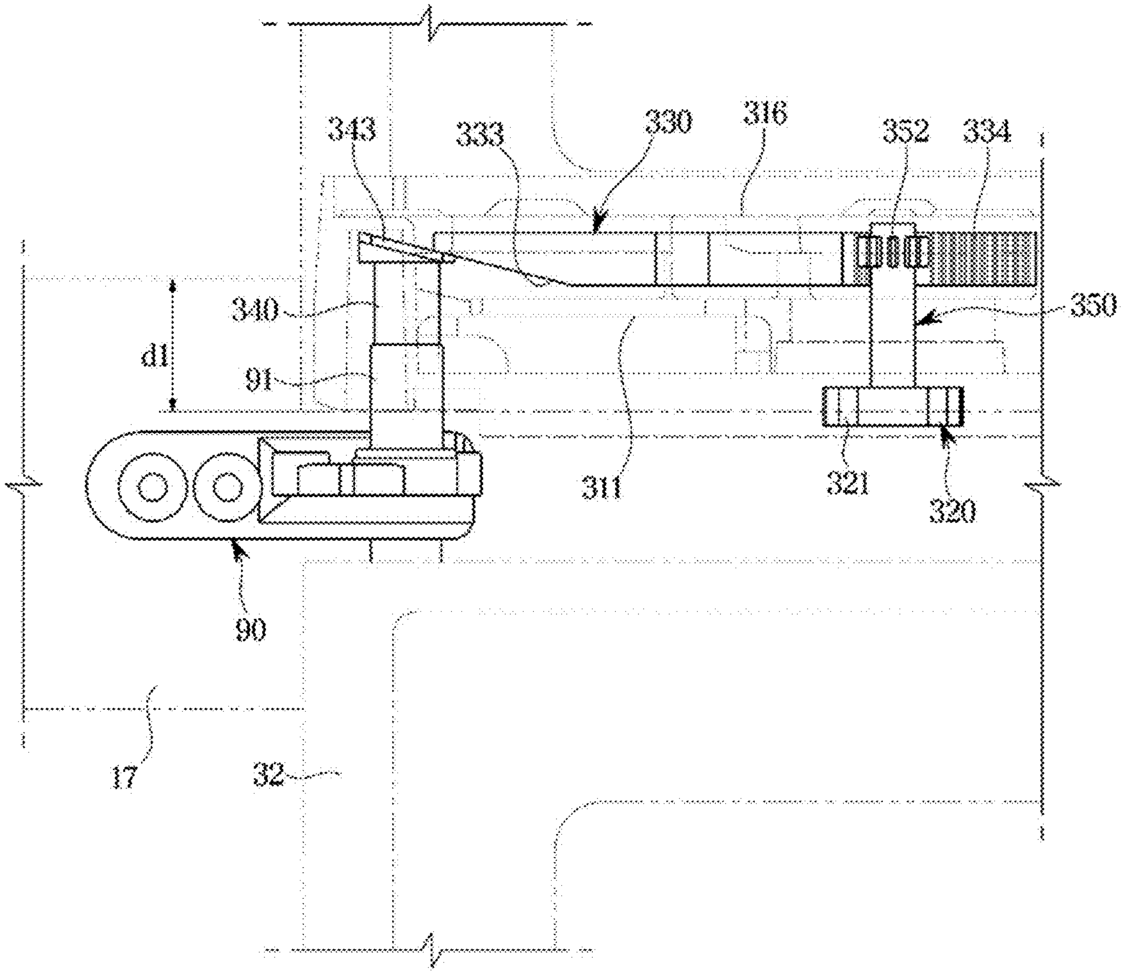
FIG. 11 is a cross sectional view illustrating a state of the height adjusting device shown in FIG. 10 that supports the first door at the first height.
Figure 12:
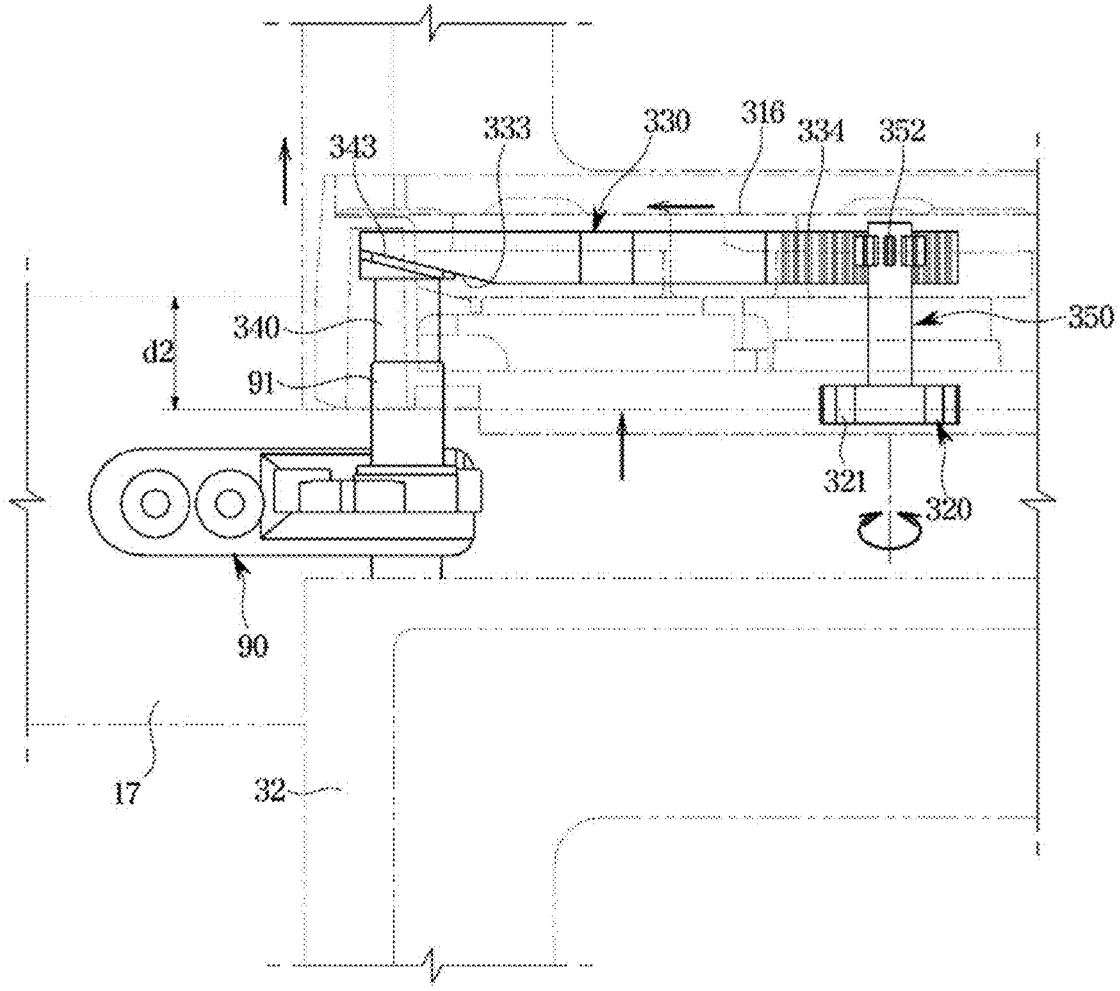
FIG. 12 is a cross sectional view illustrating a state of the height adjusting device shown in FIG. 10 that supports the first door at the second height.

FIG. 10 is a view illustrating a height adjusting device according to still another embodiment of the disclosure. FIG. 11 is a cross sectional view illustrating a state of the height adjusting device shown in FIG. 10 that supports the first door at the first height. FIG. 12 is a cross sectional view illustrating a state of the height adjusting device shown in FIG. 10 that supports the first door at the second height.

Hereinafter, a height adjusting device 300 according to the embodiment of the disclosure will be described with reference to FIGS. 10 to 12. In the following description, the same reference numerals are assigned to the same components as those of the previous embodiment shown in FIGS. 1 to 6, and detailed description thereof will be omitted.

Referring to FIG. 10, the height adjusting device 300 according to the embodiment of the disclosure includes a case 310, a lever 320, a power transmission member 330, and a support member 340.

The case 310 may include a lower case 311 and an upper case 316. The case 310 may be seated on the case seating portion 31*bd* of the lower door cap 31*b*. At least a portion of the lever 320 may be exposed to the outside of the first door 31 by the case seating portion 31*bd*.

The lower case 311 may include a lower cap fastening portion 314. The upper case 316 may include an upper cap fastening portion 317. In a state in which the upper cap fastening portion 317 and the lower cap fastening portion 314 are positioned to correspond to the device fixing portion 31*bb* of the lower door cap 31*b*, a fastening member (not shown) is coupled, so that the case 310 may be fixed to the door cap 31*b*.

The lower case 311 may include a gear insertion portion 315 into which a gear member 350 of the lever 320 is rotatably inserted.

The lever 320 may include a manipulation portion 321 and the gear member 350. The manipulation portion 321 may be provided at an approximately central portion with a gear member fixing portion 324 to which the gear member 350 is fixed.

The lever 320 according to the embodiment may be provided to rotate around a rotation axis perpendicular to a moving direction of the power transmission member 330.

The gear member 350 may have one end portion 351 fixed to the gear member fixing portion 324 of the manipulation portion 321 such that the one end portion 351 is prevented from being rotated. The gear member 350 may include a pinion 352 provided at the other end portion opposite to the one end portion 351. The pinion 352 of the gear member 350 may be formed to engage with a rack 334 of the power transmission member 330.

The power transmission member 330 may include the rack 334 formed to correspond to the pinion 352 of the lever 320. The rack 334 may be formed to engage with the pinion 352. The rack 334 may be formed to convert a rotational force of the lever 320 into a linear movement force of the power transmission member 330.

The power transmission member 330 includes a conversion inclined portion 333 such that the power transmission member 330 is linearly moved by the lever 320 while being moved in the upper and lower side direction by the support member 340. The support member 340 includes a support inclined portion 343 that interacts with the conversion inclined portion 333 to move the power transmission member 330 in the upper and lower side direction. The support member 340 may be movably accommodated in a support member accommodating portion 313 of the case 310

The support member accommodating portion 313 may include an accommodating portion opening 313*a* into which the lower end of the support member 340 is inserted. The accommodating portion opening 313*a* may be connected to the hinge opening 31*bca*, so that the support member 340 may be supported by the hinge 90 while in contact with the hinge 90.

When the lever 320 rotates in one direction, the power transmission member 330 may be moved in a direction toward the support member 340 as shown in FIG. 12. As the power transmission member 330 moves in the direction toward the support member 340, the power transmission member 330 is moved in a direction to lift the first door 31. That is, the power transmission member 330 may be moved upward with respect to the main body 10 together with the case 320 and the first door 31.

On the other hand, when the lever 320 rotates in a direction opposite to the one direction, the power transmission member 330 may be moved in a direction away from the support member 340 as shown in FIG. 11. As the power transmission member 330 moves in the direction away from the support member 340, the power transmission member 330 may be moved in a direction to lower the relative height of the first door 31 with respect to the main body 10. That is, the power transmission member 330 may be moved downward with respect to the main body 10 together with the case 220 and the first door 31.

That is, a first distance d between the lower end of the first door 31 and the upper end of the first partition 17 in a state in which the first door 31 is at a relatively lower position with respect to the main body 10 as shown in FIG. 11 is provided to be greater than a second distance d2 between the lower end of the first door 31 and the upper end of the first partition 17 in a state in which the first door 31 is at a relatively higher position with respect to the main body 10 as shown in FIG. 12.

As is apparent from the above, the refrigerator can be provided to facilitate adjusting the height of a door without a separate tool by forming at least a portion of a lever of a height adjusting device to be exposed to the outside of the door.

The refrigerator can be provided to easily and stably adjust the height of a door with a relatively small force by configuring a height adjusting device to change the direction of a force applied to a lever and transmit the force to the door.

The refrigerator can be provided with a neat external appearance by providing a height adjusting device on a door such that the height adjusting device is positioned between the doors.

Although the air conditioner has been described by way of embodiments in relation to a specific shape and direction, the above embodiments are illustrative purpose only, and it would be appreciated by those skilled in the art that changes and modifications may be made in these embodiments without departing from the principles and scope of the disclosure, the scope of which is defined in the claims and their equivalents.

What is claimed is:

1. A refrigerator comprising:

a main body configured to form a storage chamber;

a door configured to open and close the storage chamber;

a hinge configured to rotatably support the door; and a height adjusting device configured to be coupled to the hinge and located inside the door, wherein the height adjusting device includes:

a lever that is operable from an outside of the door, a power transmission member that is movable as the lever rotates, a support member supported by the hinge, and configured to guide the power transmission member to move in a first approximately vertical direction as the lever rotates to move the power transmission member in a first approximately horizontal direction so that a height of the door is increased, and guide the power transmission member to move in a second approximately vertical direction as the lever rotates to move the power transmission member in a second approximately horizontal direction so that the height of the door is decreased, and a case fixed to the door, in which the power transmission member is movably accommodated, and configured to allow movement of the power transmission member relative to the case in the first approximately horizontal direction or the second approximately horizontal direction while restricting movement of the power transmission member relative to the case in the first approximately vertical direction and the second approximately vertical direction.

2. The refrigerator of claim 1, wherein the lever is rotatable and configured to move the power transmission member linearly in the first approximately horizontal direction and the second approximately horizontal direction according to a direction of rotation of the lever.

3. The refrigerator of claim 1, wherein the support member is configured to guide the power transmission member to perform relative movement with respect to the door to thereby adjust the height of the door.

4. The refrigerator of claim 1, wherein the support member includes a support inclined portion configured to support the power transmission member such that the height of the door is adjusted in response to the power transmission member being moved in the first approximately horizontal direction and the second approximately horizontal direction.

5. The refrigerator of claim 1, wherein the power transmission member includes a conversion inclined portion supported by the support member such that the height of the door is adjusted in response to the power transmission member being moved in the first approximately horizontal direction and the second approximately horizontal direction.

6. The refrigerator of claim 1, wherein the first approximately horizontal direction is set as a direction in which the power transmission member moves toward the support member, and the second approximately horizontal direction is set as a direction in which the power transmission member moves away from the support member.

7. The refrigerator of claim 1, wherein the case includes a lever opening formed to allow at least a portion of the lever to be exposed to the outside of the door.

8. The refrigerator of claim 1, wherein the door is an upper door and the refrigerator includes a lower door, and the height adjusting device is located on one end of the upper door adjacent to the lower door.

9. The refrigerator of claim 1, further comprising:

a bolt provided to rotate as the lever rotates; and a nut couplable to the bolt, and while coupled to the bolt configured to be movable together with the power transmission member.

10. The refrigerator of claim 9, wherein the nut is fixed so as to be restricted from performing relative rotation with respect to the power transmission member.

11. The refrigerator of claim 1, wherein the lever is provided to be manipulated from the outside of the door while the storage chamber is closed by the door.

12. The refrigerator of claim 1, wherein the lever includes a screw thread spirally extended with the first approximately horizontal direction or the second approximately horizontal direction as an axis, and the power transmission member includes a rack formed to be engaged with the screw thread.

13. The refrigerator of claim 1, wherein the lever includes a manipulation portion and a pinion at a side opposite to the manipulation portion, and the power transmission member includes a rack formed to be engaged with the pinion.

14. A refrigerator comprising:

a main body configured to form a storage chamber;

a door configured to open and close the storage chamber;

a hinge configured to rotatably support the door; and a height adjusting device configured to be coupled to the hinge and provided on the door, wherein the height adjusting device includes:

a lever having at least a portion thereof exposed to an outside of the door, the lever being rotatable from the outside of the door, a bolt fixed to the lever, and provided to rotate together with the lever, a nut coupled to the bolt, a power transmission member, to which the nut is fixed, and that is movable as the lever rotates, a support member supported by the hinge, and configured to support the power transmission member such that a height of the door is adjusted in response to the power transmission member being moved by the lever toward and away from the support member, and a case fixed to the door, in which the power transmission member is movably accommodated, and formed to allow relative movement of the power transmission member in a first direction and a second direction while restricting relative movement of the power transmission member in a height direction of the door.

15. The refrigerator of claim 14, wherein the support member includes a support inclined portion configured to support the power transmission member in a direction to change the height of the door when the power transmission member is moved by the lever, and the power transmission member includes a conversion inclined portion provided to correspond to the support inclined portion.

16. The refrigerator of claim 14, wherein the power transmission member is configured to perform move relative movement with respect to the door.

17. The refrigerator of claim 14, wherein the door is an upper door and the refrigerator includes a lower door, and the height adjusting device is located at one end of the upper door adjacent to the lower door.

18. A refrigerator comprising:

a main body configured to form a storage chamber;

a door configured to open and close the storage chamber;

a hinge configured to rotatably support the door; and a height adjusting device mountable on the door, wherein the height adjusting device includes:

a lever having a manipulation portion that is exposed to an outside of the door, the lever being rotatable from the outside of the door, a power transmission member configured to be movable as the lever rotates, a support member supported by the hinge, and including a support inclined portion formed to move the power transmission member along a height direction of the door when the power transmission member is moved by the lever toward and away from the support member, and a case fixed to the door, in which the power transmission member is movably accommodated, and formed to allow relative movement of the power transmission member in a first direction and a second direction while restricting relative movement of the power transmission member in a height direction of the door.

* * * * *